United States Patent [19]
Messerli et al.

[11] Patent Number: 6,078,489
[45] Date of Patent: Jun. 20, 2000

[54] METHOD FOR PERFORMING INSTANTANEOUS PROTECTION IN A TRIP UNIT

[75] Inventors: Alan Joseph Messerli, Bristol; James Arthur Marple, Newtown; Michael Roger Koller, Plainville, all of Conn.

[73] Assignee: General Electric Company, Schnectady, N.Y.

[21] Appl. No.: 09/137,396

[22] Filed: Aug. 20, 1998

[51] Int. Cl.[7] ....................................... H02H 3/18
[52] U.S. Cl. .............................. 361/87; 361/78; 361/63; 361/93.2
[58] Field of Search ................................. 361/93–97, 102, 361/78–79, 86–87, 62–65, 67, 93.1, 93.2; 702/58, 64

[56] References Cited

U.S. PATENT DOCUMENTS

| | | | |
|---|---|---|---|
| 4,550,360 | 10/1985 | Dougherty | 361/93 |
| 4,631,625 | 12/1986 | Alexander et al. | 361/94 |
| 4,733,321 | 3/1988 | Lindeperg | 361/96 |
| 4,926,282 | 5/1990 | McGhie | 361/102 |
| 4,943,888 | 7/1990 | Jacob et al. | 361/96 |
| 5,485,093 | 1/1996 | Russell et al. | 324/522 |
| 5,751,532 | 5/1998 | Kanuchok et al. | 361/94 |

*Primary Examiner*—Michael J. Sherry
*Attorney, Agent, or Firm*—Cantor Colburn LLP; Damian G. Wasserbauer; Carl B. Horton

[57] ABSTRACT

A method of performing instantaneous protection in a trip unit is presented. The electronic trip unit includes a microcontroller and associated ROM having trip unit application code, e.g., main functionality firmware, including initializing parameters, and boot code, stored therein and EEPROM having operational parameter code stored therein. An instantaneous protection algorithm (program) stored in the memory of the trip unit has a 'WAIT' state and a 'RUN' state. In the RUN state samples of the sensed current that classify as points that are accumulated in a point register. Accumulation of a determined number of points qualifies as a peak. These peaks are accumulated in a peak register. If a point is not detected within a determined time period, then the count of peaks accumulated in the peak register is decremented, thereby provided a cooling function. When the count in the peak register exceeds the sensor limit a signal is generated by the microcontroller to initiate the trip.

29 Claims, 4 Drawing Sheets

METHOD FOR PERFORMING INSTANTANEOUS PROTECTION IN A TRIP UNIT

BACKGROUND OF THE INVENTION

The present invention relates generally to trip units. More specifically, the present invention relates a method of instantaneous protection in an electronic trip unit.

Electronic trip units are well known. Electronic trip units typically comprise voltage and current sensors which provide analog signals indicative of the power line signals. The analog signals are converted by an A/D (analog/digital) converter to digital signals which are processed by a microcontroller. The trip unit further includes RAM (random access memory), ROM (read only memory) and EEPROM (electronic erasable programmable read only memory) all of which interface with the microcontroller. The ROM includes trip unit application code, e.g., main functionality firmware, including initializing parameters, and boot code. The EEPROM includes operational parameters for the application code.

These trip units are required to meet certain standards, e.g., UL/ANSI/IEC, which define trip time curves specifying under what conditions a trip must occur, i.e., short time, long time, instantaneous, or ground fault, all of which are well known. These standards also specify a short time delay from the instant power is applied to when a trip unit must be ready to trip.

The present invention is being directed to the instantaneous trip condition. Various electronic circuits (analog electronics) and customized integrated circuits (application specific integrated circuit (ASIC)) have been employed to perform instantaneous protection. The microcontroller of the present trip units has also been programmed to execute algorithms which implement a protection curve, such curves are typically specified by the aforementioned standards.

SUMMARY OF THE INVENTION

The above-discussed and other drawbacks and deficiencies of the prior art are overcome or alleviated by the method of instantaneous protection utilizing an instantaneous protection algorithm in the microcontroller of the electronic trip unit of the present invention. It is an object of the present invention to eliminate the added electronic circuitry and customized integrated circuits that have been employed to perform instantaneous protection in the prior art, by utilizing the existing microcontroller of the trip unit to process the instantaneous protection algorithm of the present invention. It is also an object of the present invention to provide a cooling function and a filtering function to avoid false or nuisance trips.

The electronic trip unit of the present invention being particularly well suited for used in a selective system. The selective system comprising a source, an upstream circuit breaker and trip unit, a plurality of downstream circuit breakers and trip units and corresponding loads. The downstream circuit breakers and trip units are rated to meet the demands of the corresponding loads and are set to trip at lower number of detected peaks. The upstream circuit breaker and trip unit is rated to meet the demands of the system and is set to trip at a higher number of detected peaks.

The electronic trip unit comprising voltage and current sensors which provide analog signals indicative of the power line signals. The analog signals are converted by an A/D (analog/digital) converter to digital signals which are processed by a microcontroller. The trip unit further includes RAM (random access memory), ROM (read only memory) and EEPROM (electronic erasable programmable read only memory) all of which communicate with the microcontroller. The ROM includes trip unit application code, e.g., main functionality firmware, including initializing parameters, and boot code. The application code includes code for the instantaneous protection algorithm of the present invention. The EEPROM includes operational parameters, e.g., code for setting the number of peaks for a trip (the sensitivity of the trip unit), for the application code. These parameters will typically be stored in the trip unit at the factory and are selected to meet customers' requirements, but can be remotely downloaded as described hereinafter.

In accordance with the present invention, an instantaneous protection algorithm is applied to each of the phases of the power lines. The instantaneous protection algorithm (program) is initiated preferably from the boot code at start-up. The program has a 'WAIT' state and a 'RUN' state. In the RUN state samples of the sensed current which has been digitized and presented to the microcontroller are compared to a threshold level in the microcontroller. When a sample is above this threshold level then it is classified as a point. These points are accumulated in a point register of the microcontroller where a count of points is incremented. When the sample is below the threshold level, then it is not a point and the point register is cleared.

In the WAIT state samples of the sensed current which has been digitized and presented to the microcontroller are compared to another threshold level in the microcontroller. When a sample is below this threshold level, the program state is set to the 'RUN' state. When the sample is above this threshold, the point register is cleared. After the point register is cleared a counter register of the microcontroller is incremented. The count in this register is compared to a limit. When the count is greater than the limit, a peak register in the microcontroller, which accumulates peaks, is decremented. Next, the counter register is cleared and the program is restarted. When the count is less than the limit the program is restarted.

After the point register is incremented the count in the point register is compared to a limit. When the count in the point register is not greater than or equal to the limit the counter register is cleared and the program is restarted. When the count in the point register is greater than or equal to the limit the program is set to the 'WAIT' state. The peaks register is then incremented and the points register is cleared. The count in the peaks register is compared to a sensor limit. When the count in the peaks register is not greater than or equal to the sensor limit the counter register is cleared and the program is restarted. When the count in the peaks register is greater than or equal to the sensor limit a signal is generated by the microcontroller to initiate a trip. The counter register is then cleared and the program is ended until the unit is reset causing the program to be restarted.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
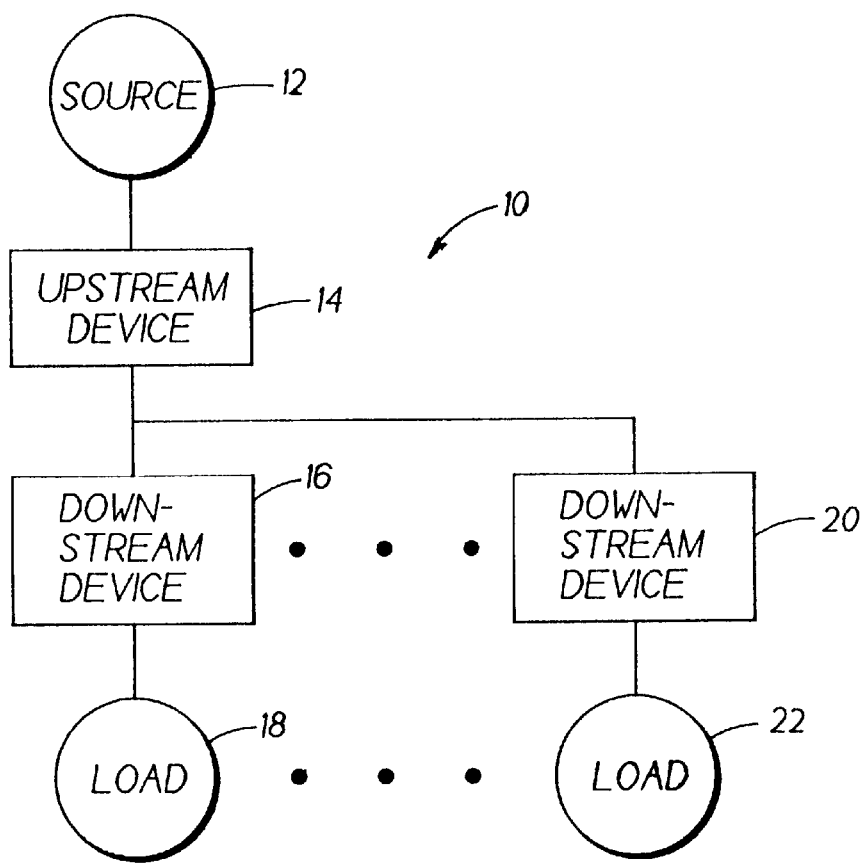
FIG. 1 is a schematic block diagram of a selective system.

Referring to FIG. 1, a selective system is generally shown at 10. Selective system 10 comprises a source 12, an upstream device (circuit breaker and trip unit) 14, a downstream device (circuit breaker and trip unit) 16 and at least one corresponding load 18. Any number of additional downstream devices (circuit breakers and trip units) 20 with corresponding loads 22 may be included. The downstream devices 16, 20 are rated to meet the demands of the corresponding loads 18, 22 and are set to trip at lower number of detected peaks, i.e., a higher sensitivity (described hereinafter). The upstream device 14 is rated to meet the demands of the system and is set to trip at a higher number of detected peaks, i.e., a lower sensitivity (described hereinafter).

Figure 2:
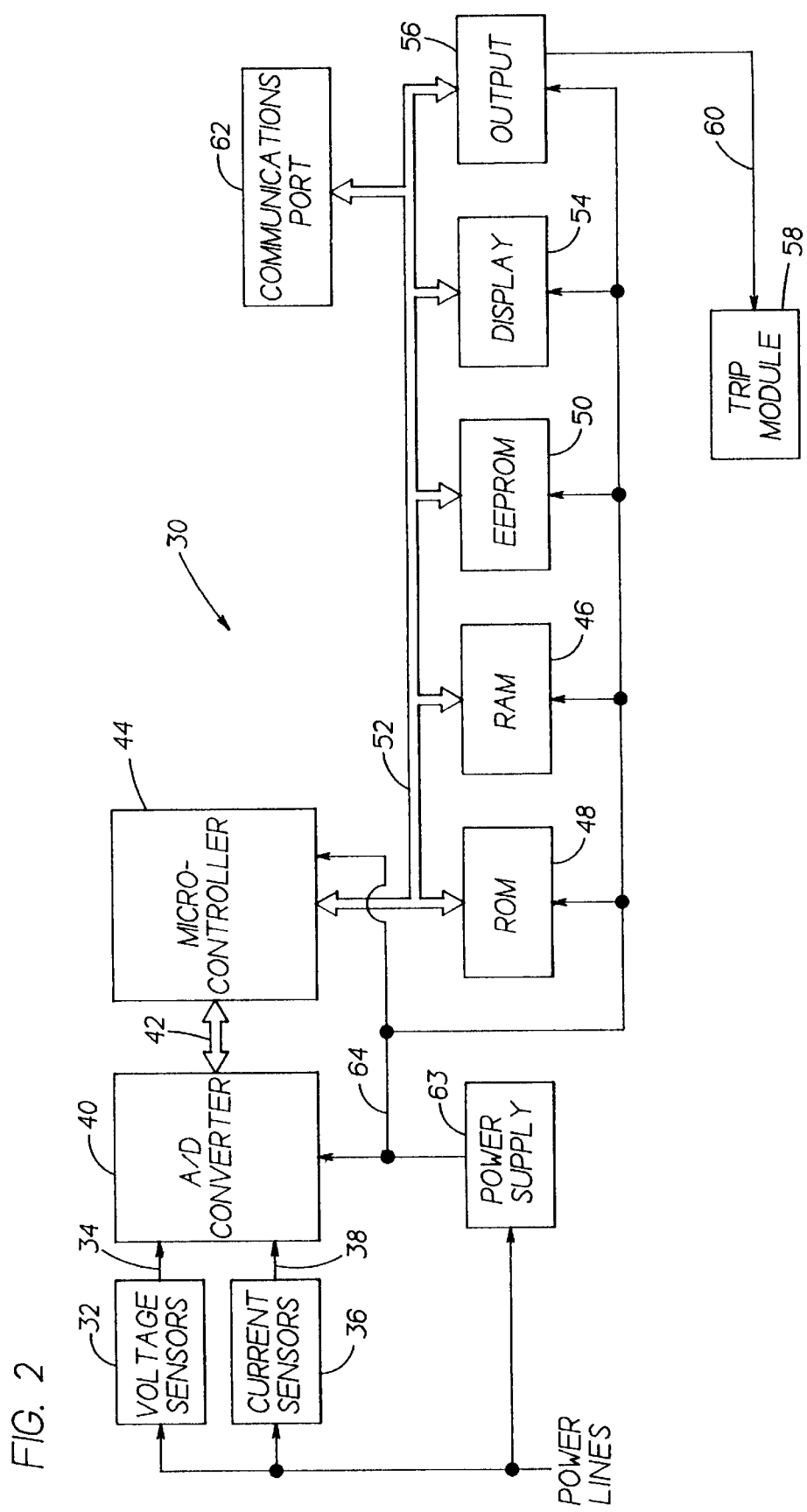
FIG. 2 is a schematic block diagram of an electronic trip unit.

Referring to FIG. 2, a general schematic of a trip unit is generally shown at 30. Trip unit 30 comprises a voltage sensor 32 which provides analog signals indicative of voltage measurements on a signal line 34 and a current sensor 36 which provides analog signals indicative of a current measurements on a signal line 38. The analog signals on line 34 and 38 are presented to an A/D (analog/digital) converter 40, which converts these analog signals to digital signals. The digital signals are presented over a bus 42 to a microcontroller (signal processor) 44, such being commercially available from the Hitachi (Hitachi's H8/300 family of microcontrollers). Trip unit 30 further includes RAM (random access memory) 46, ROM (read only memory) 48 and EEPROM (electronic erasable programmable read only memory) 50 all of which communicate with the microcontroller 44 over a control bus 52. It will be appreciated that A/D converter 40, ROM 48, RAM 46, or any combination thereof, may be internal to microcontroller 44, as is well known. EEPROM 50 is non-volatile so that system information and programming will not be lost during a power interruption or outage. Data, typically status of the circuit breaker, is displayed by a display 54 in response to display signals received from microcontroller 44 over control bus 52. An output control device 56, in response to control signals received from microcontroller 44 over control bus 52, controls a trip module 58 via a line 60. Calibration, testing, programming and other features are accomplished through a communications I/O port 62, which communicates with microcontroller 44 over control bus 52. A power supply 63 which is powered by the service electricity, provides appropriate power over a line 64 to the components of trip unit 30. ROM 48 includes trip unit application code, e.g., main functionality firmware, including initializing parameters, and boot code. The application code includes code for the instantaneous protection algorithm of the present invention. EEPROM 50 includes operational parameter code, e.g., code for setting the number of peaks for a trip (the sensitivity of the trip unit). These parameters will typically be stored in the trip unit at the factory and are selected to meet customers' requirements, but can be remotely downloaded as described hereinafter.

The instantaneous protection algorithm is run in real-time and should be initialized in sufficient time to meet the aforementioned industry standards. More specifically, the algorithm should be ready to initiate a trip within the short time delay specified by the standards, i.e., the time between when instantaneous power is applied to when the trip unit must be ready to trip.

Figure 3:
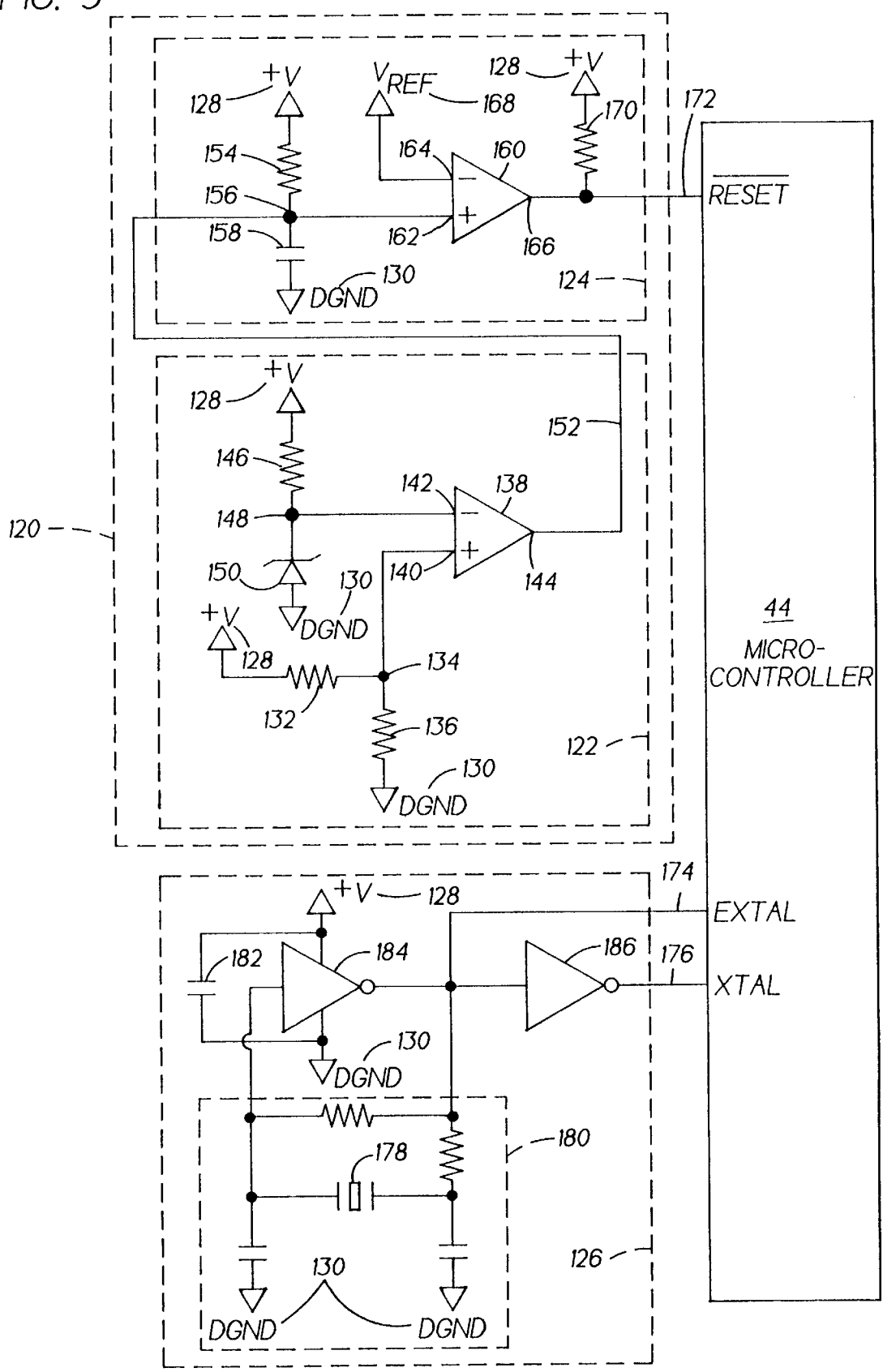
FIG. 3 is a schematic diagram of a power-on-reset circuit and an external oscillator circuit.

FIG. 3 shows generally a power-on-reset circuit 120 and an external oscillator circuit 126 used for initializing microcontroller 44 within the aforementioned standards. Power-on-reset circuit 120 includes a first comparator circuit 122 and a second comparator circuit 124.

First comparator circuit 122 determines when there is sufficient voltage to operate the microcontroller 44. Circuit 122 includes a positive voltage 128 connected to a digital ground 130 through a voltage divider comprising resistors 132 and 136. Junction 134, between resistors 132 and 136, is connected to comparator 138 at its non-inverting input 140. Positive voltage 128 is also connected to digital ground 130 through the series combination of resistor 146 and zener diode 150. Junction 148, between resistor 146 and zener 150, is connected to comparator 138 at its inverting input 142. Open collector output 144 of comparator 138 is connected to the second comparator circuit 124 by line 152. When voltage 128 is applied, zener 150 establishes a reference level voltage at inverting input 142. If voltage 128 is sufficiently high to operate the microcontroller 44 then the voltage at non-inverting input 140 will exceed the reference level voltage at inverting input 142, and output 144 will open to present a high impedance output to circuit 124. This initializes the process of taking the microcontroller 44 out of reset. If voltage 128 is below the operating voltage of the microcontroller 44 then the voltage at inverting input 142 will exceed non-inverting input 140, and output 144 will close to conduct to ground 130 and hold the microcontroller 44 in reset.

When voltage 128 is sufficiently high to run microcontroller 44, second comparator circuit 124 takes the microcontroller 44 out of reset after a predetermined period of time. Circuit 124 includes voltage 128 connected to digital ground 130 through the series combination of resistor 154 and capacitor 158. Junction 156, between resistor 154 and capacitor 158, is connected to open collector output 144 through line 152. The junction 156 is also connected to comparator 160 at its non-inverting input 162. A reference voltage 168 is connected to comparator 160 at its inverting input 164. Open collector output 166 of comparator 160 is connected to positive voltage 128 through pull up resistor 170, and is also connected to the reset port of microcontroller 44 through line 172. If voltage 128 is below the operating voltage of microcontroller 44 then output 144 clamps the voltage at junction 156 to digital ground 130, preventing capacitor 158 from charging. Therefore the voltage level at inverting input 164 will be positive with respect to the voltage level at non-inverting input 162, and the open collector output 166 will close to conduct to digital ground 130 and hold the microcontroller 44 in reset. When voltage 128 is sufficiently high, output 144 presents a high impedance output to junction 156 and the capacitor 158 will charge at a rate determined by the RC time constant of resistor 154 and capacitor 158. After a predetermined period of time, as determined by the RC time constant, the voltage at non-inverting input 162 will exceed the reference voltage 168 at inverting input 164. Therefore open collector output 166 will open and provide positive voltage 128 through pull up resistor 170, taking the microcontroller 44 out of reset.

External oscillator circuit 126 is connected to extal port and xtal port of microcontroller 44 through lines 174 and 176 respectively, and is well known. External oscillator circuit 126 includes microcontroller clock 180 having crystal 178. Circuit 126 further includes capacitor 182, inverter 184, and inverter 186 to drive the microcontroller clock 180 while power-on-reset circuit 120 is powering on and resetting the microcontroller 44. Therefore the external oscillator circuit 126 enables the system clock (not shown) to start up within the aforementioned standards, e.g., less than two milliseconds.

Figure 4:
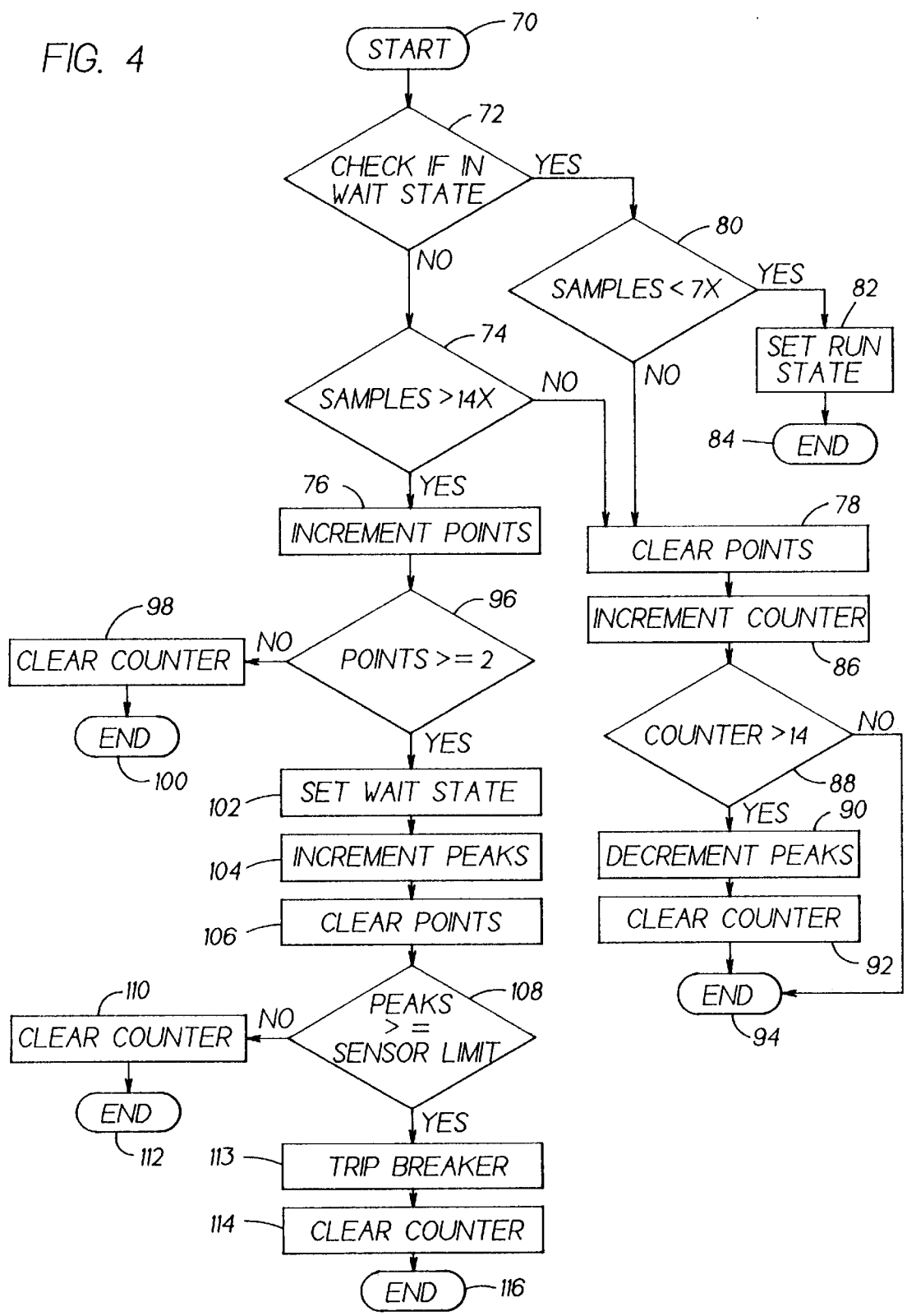
FIG. 4 is a flow diagram of the instantaneous algorithm of the present invention.

Referring to FIG. 4, the instantaneous protection algorithm is applied to each of the phases of the power lines. The instantaneous protection algorithm (program) is initiated preferably from the boot code at start-up, block 70, and proceeds immediately to block 72. At block 72 the program determines if it is in a 'WAIT' state. The 'WAIT' state is a state of the program where the accumulation of points (described hereinafter) is stopped once a peak is determined until the signal falls below a predetermined amount. The program correspondingly has a 'RUN' state which is the opposite of the 'WAIT' state. The 'RUN' state is a state of the program where the points and peaks are accumulated, in accordance with the instantaneous protection algorithm of the present invention.

If the program is not in the WAIT state then proceed to block 74. At block 74, samples of the sensed current which has been digitized and presented to the microcontroller 44 (as described above) are compared to a threshold level in the microcontroller. When a sample is above this threshold level, e.g., 14× (fourteen times the rated current), then it is classified as a point, i.e., a point is detected. These points are accumulated in a register (a point register) of the microcontroller, at block 76, where a count of points is incremented (increased by one). When the sample is below the threshold level (14×), then it is not a point and the point register is cleared, at block 78.

If the program is in the WAIT state then proceed to block 80. At block 80, samples of the sensed current which has been digitized and presented to the microcontroller 44 (as described above) are compared to another threshold level in the microcontroller. When a sample is below this threshold level, e.g., 7× (seven times the rated current), then set the program state to a 'RUN' state, i.e., the program is not in the WAIT state, at block 82, and then end at block 84. When the sample is above this threshold (7×), then the point register is cleared, at block 78.

After the point register is cleared at block 78 a counter register of the microcontroller in incremented, at block 86. The count in this register is compared to a limit, e.g., 14 counts, at block 88. When the count is greater than the limit, a register (a peak register) of the microcontroller accumulating peaks is decremented, i.e., the number of peaks is decreased by one, at block 90. The accumulation of peaks in the peak register is described hereinafter. Next, the counter register is cleared, at block 92, and then end at block 94. When the count is less than the limit, end at block 94. It is an important feature of the present invention that the count register provides for a cooling function when a number of peaks are to be accumulated. More specifically, if the count register accumulates to the limit, in this example the limit (14 counts) which corresponds in time to a full half cycle of current, without a point occurring, then the peak register is decremented by one, as described above.

After the point register is incremented at block 76, the count in the point register is compared to a limit, e.g., 2 points, at block 96. When the count in the point register is not greater than or equal to the limit the counter register is cleared, at block 98, and then end at block 100. When the count in the point register is greater than or equal to the limit the program is set to the 'WAIT' state, at block 102. The peak register is then incremented by one, at block 104, i.e., a peak is detected. The point register is cleared at block 106. Requiring that a number of points must be accumulated to count as a peak, provides filtering of the waveform, so that false or nuisance trips will not occur. This filtering is an important feature of the present invention.

The count in the peak register is compared to a sensor limit, at block 108. The sensor limit sets or defines the sensitivity of the trip unit discussed hereinbefore. It is within the scope of the present invention that the sensor limit is variable, i.e., not fixed. When the count in the peak register is not greater than or equal to the sensor limit the counter register is cleared, at block 110, and then end at block 112. When the count in the peak register is greater than or equal to the sensor limit a signal is generated by the microcontroller 44 and is presented to the output control device 56 to initiate a trip, at block 113. The output control device 56 communicates a trip signal to the trip module 58 via line 60, as described hereinabove. The higher the sensor limit (i.e., number of peaks required for a trip) the less sensitive the unit and the lower the sensor limit the more sensitive the unit. As described hereinbefore, the sensitivity of the unit is dictated by the customer's/user's needs and its location in a selective system. The counter register is then cleared, at block 114, and then end at block 116.

At end steps 84, 94, 100 and 112 the program returns to step 72 and the above process is continued until the unit is shut down or after a trip at end step 116.

All of the aforementioned limits or settings are preferably stored in EEPROM 50 and can be altered by downloading desired settings via communications I/O port 62. This would include remotely downloading such data when the unit is connected to a system computer (not shown), either directly, over telephone lines, or any other suitable connection. It may also be preferred that EEPROM 50 comprises a flash memory whereby such data is flashed, as is well known.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of protection in an electronic trip unit, comprising:

sensing an electrical signal to provide a sensed signal indicative of an electrical characteristic of the electrical signal;

comparing said sensed signal to a first threshold;

generating a point signal when said sensed signal exceeds said first threshold;

incrementing a point count for each said point signal generated;

generating a peak signal when said point count reaches a first limit;

incrementing a peak count for each said peak signal generated; and generating a trip signal when said peak count reaches a second limit.

2. The method of claim 1 further comprising:

suspending said generating said point signal when said point count reaches said first limit;

comparing said sensed signal to a second threshold; and resuming said generating said point signal when said sensed signal declines to a level below said second threshold.

3. The method of claim 2 further comprising:

incrementing an interval count when said sensed signal rises to a level above said second threshold; and decrementing said peak count when said interval count reaches a third limit.

4. The method of claim 2 wherein said first threshold is greater than said second threshold.

5. The method of claim 1 further comprising:
incrementing an interval count when said sensed signal is less than said first threshold; and
decrementing said peak count when said interval count reaches a third limit.

6. The method of claim 5 further comprising:
clearing said point count when said sensed signal is less than said first threshold.

7. The method of claim 5 further comprising:
clearing said interval count after said decrementing said peak count.

8. The method of claim 5 further comprising:
clearing said interval count after said incrementing said point count and when said point count is below said first limit.

9. The method of claim 5 further comprising:
clearing said interval count after said incrementing said peak count and when said peak count is below said second limit.

10. The method of claim 5 further comprising:
clearing said interval count after said generating said trip signal.

11. The method of claim 5 wherein said third limit corresponds in time to about one half cycle of the electrical signal.

12. The method of claim 1 further comprising:
clearing said point count after said incrementing said peak count.

13. The method of claim 1 wherein said electrical characteristic comprise electrical current.

14. The method of claim 1 further comprising:
remotely setting at least one of said first threshold, said first limit and said second limit.

15. An electronic trip unit comprising:
a sensor for sensing an electrical signal to provide a sensed signal indicative of an electrical characteristic of the electrical signal; and
a signal processor responsive to said sensed signal, and having memory for storing signals including program signals defining an executable program for,
comparing said sensed signal to a first threshold,
generating a point signal when said sensed signal exceeds said first threshold,
incrementing a point count for each said point signal generated,
generating a peak signal when said point count reaches a first limit,
incrementing a peak count for each said peak signal generated, and
generating a trip signal when said peak count reaches a second limit.

16. The electronic trip unit of claim 15 wherein said program signals further define said executable program for:
suspending said generating said point signal when said point count reaches said first limit;
comparing said sensed signal to a second threshold; and
resuming said generating said point signal when said sensed signal declines to a level below said second threshold.

17. The electronic trip unit of claim 16 wherein said program signals further define said executable program for:
incrementing an interval count when said sensed signal rises to a level above said second threshold; and
decrementing said peak count when said interval count reaches a third limit.

18. The electronic trip unit of claim 16 wherein said first threshold is greater than said second threshold.

19. The electronic trip unit of claim 15 wherein said program signals further define said executable program for:
incrementing an interval count when said sensed signal is less than said first threshold; and
decrementing said peak count when said interval count reaches a third limit.

20. The electronic trip unit of claim 19 wherein said program signals further define said executable program for:
clearing said point count when said sensed signal is less than said first threshold.

21. The electronic trip unit of claim 19 wherein said program signals further define said executable program for:
clearing said interval count after said decrementing said peak count.

22. The electronic trip unit of claim 19 wherein said program signals further define said executable program for:
clearing said interval count after said incrementing said point count and when said point count is below said first limit.

23. The electronic trip unit of claim 19 wherein said program signals further define said executable program for:
clearing said interval count after said incrementing said peak count and when said peak count is below said second limit.

24. The electronic trip unit of claim 19 wherein said program signals further define said executable program for:
clearing said interval count after said generating said trip signal.

25. The electronic trip unit of claim 19 wherein said third limit corresponds in time to about one half cycle of the electrical signal.

26. The electronic trip unit of claim 15 wherein said program signals further define said executable program for:
clearing said point count after said incrementing said peak count.

27. The electronic trip unit of claim 15 wherein said electrical characteristic comprise electrical current.

28. The electronic trip unit of claim 15 further comprising:
a communication port for communicating signals external of said electronic trip unit to said signal processor for remotely setting at least one of said first threshold, said first limit and said second limit.

29. A selective system including at least one electronic trip unit wherein said at least one electronic trip unit comprises:
a sensor sensing an electrical signal to provide a sensed signal indicative of an electrical characteristic of the electrical signal;
and a signal processor responsive to said sensed signal, and having memory for storing signals including program signals defining an executable program for,
comparing said sensed signal to a first threshold;
generating a point signal when said sensed signal exceeds said first threshold;
incrementing a point count for each said point signal generated;
generating a peak signal when said point count reaches a first limit;
incrementing a peak count for each said peak signal generated; and
generating a trip signal when said peak count reaches a second limit.

* * * * *